US007660808B2

(12) United States Patent
Brechner et al.

(10) Patent No.: US 7,660,808 B2
(45) Date of Patent: *Feb. 9, 2010

(54) AUTOMATICALLY INDEXING A COLLECTION OF FILES OF A SELECTED TYPE

(75) Inventors: Eric L. Brechner, Woodinville, WA (US); Joel E. Wiljanen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

This patent is subject to a terminal disclaimer.

(21) Appl. No.: 10/846,733

(22) Filed: May 14, 2004

(65) Prior Publication Data

US 2004/0215643 A1    Oct. 28, 2004

Related U.S. Application Data

(63) Continuation of application No. 09/837,851, filed on Apr. 18, 2001, now Pat. No. 6,741,996.

(51) Int. Cl.
G06F 7/00      (2006.01)
G06F 17/30     (2006.01)
(52) U.S. Cl. ...................................... 707/102
(58) Field of Classification Search ................ None
See application file for complete search history.

(56) References Cited

U.S. PATENT DOCUMENTS 5,680,617 A     10/1997  Gough et al. ............ 707/104.1
5,861,918 A     1/1999   Anderson et al. ........ 348/231.9
5,906,397 A     5/1999   MacWilliams et al. ....... 283/36
6,151,624 A *   11/2000  Teare et al. ................ 709/217
6,353,823 B1    3/2002   Kumar ......................... 707/3
6,366,934 B1    4/2002   Cheng et al. ............... 715/513
6,374,260 B1*   4/2002   Hoffert et al. ............ 707/104.1
6,449,627 B1    9/2002   Baer et al. ................. 715/514
6,564,202 B1    5/2003   Schuetze et al. ........ 707/103 R
6,567,797 B1    5/2003   Schuetze et al. ............. 707/2
6,574,629 B1    6/2003   Cooke et al. ................ 707/10
6,584,459 B1    6/2003   Chang et al. ................. 707/3
2002/0019827 A1  2/2002   Shiman et al. ............. 707/200
2002/0069218 A1  6/2002   Sull et al. ................ 707/501.1
2003/0074369 A1  4/2003   Schuetze et al. ........ 707/103 R
2003/0093790 A1  5/2003   Logan et al. ................. 725/38

* cited by examiner

Primary Examiner—Neveen Abel Jalil
Assistant Examiner—Michael J Hicks

(57) ABSTRACT

Media clips on a hard drive or other storage are automatically organized in collections and metadata automatically assigned to facilitate subsequent searching for media clips. A Clip Organizer software application initially scans a user's hard drive to identify folders containing user files of sound, picture, clip art, video and other media clips. Predefined types of folders are omitted in the scan to avoid identifying media clips that do not belong to the user or are part of another application program. A partially "flattened" collection hierarchy is created to simplify browsing the media clips. Sufficient empty files are included to enable a user to readily locate the collections, and metadata comprising keywords derived from the path of each media clip are associated with each of the media clips to facilitate subsequent searching for the files. In addition, the collection hierarchy is automatically updated as changes are made.

28 Claims, 10 Drawing Sheets

AUTOMATICALLY INDEXING A COLLECTION OF FILES OF A SELECTED TYPE

RELATED APPLICATION

This is a continuation of U.S. patent application Ser. No. 09/837,851, filed Apr. 18, 2001, the benefit of the filing date of which is hereby claimed under 35 U.S.C. §120.

FIELD OF THE INVENTION

The present invention generally relates to a method and system for managing user content on a computer system, and more specifically, pertains to automating the indexing of media content in a simplified hierarchical storage scheme and the automated assignment of keywords and other metadata to the media content to facilitate its retrieval.

BACKGROUND OF THE INVENTION

With the increased use of digital cameras, Web site image files, home video editing files, sound files, and other types of user media content stored on a hard drive, there is a clear need to provide a scheme to manage and more efficiently access these files. It is common for users to create a number of different folders at scattered locations on one or more hard drives to hold clip art, digital camera photos, video files and other types of image and sound media files. While the prior art includes programs that search a user's hard drive to identify media files for inclusion in a common listing or index, an efficient technique for automatically creating a hierarchical collection of the media-specific files has not previously been developed. In the past, users have been required to import personal content into an organizer program and manually input keywords and other metadata parameters that would enable a user to subsequently access a desired type or category of media file, or a specific media file.

Once all of the media files on a user's system are indexed and associated with keywords and other identifying metadata, it becomes relatively easy to locate a group of related media files or a specific media file. However, creating such an index and manually entering keywords and other metadata that will then enable the efficient access of media files becomes a daunting task that may involve many hours of a user's time. For this reason, most users are reluctant to take the time necessary to index and enter metadata for media files. As a result, media files are often misplaced, or at the very least, are difficult to locate on most users's hard drives. Without a centralized index and the ability to search through hundreds of media files based on metadata, a user can spend considerable time locating desired media files. The user must locate each potential folder in which one or more desired media file might be stored and then visually search through the files stored therein. While this task may require much less time than manually entering metadata, it is typically repeated so many times that the cumulative time lost can be much greater than that needed to index the files.

Even after a user's media files are manually indexed and associated with metadata, the user must still periodically update the indexing and associate new media files with metadata. This maintenance function also requires considerable time and effort. Accordingly, it will be apparent that an automated technique for both indexing and associating keywords and other metadata with media files on an ongoing basis would be desirable, since the user would then not need to manually implement this task, and would benefit from being able to readily locate one or more desired media files among all of those stored in various folders on the user's computer system. As new media files are stored, it would be desirable to automatically add the files to the index scheme and include the corresponding metadata that will enable a user to find the files when desired. Furthermore, the index scheme should be relatively simple, hierarchical, and avoid including unnecessary path information that relates to the location of non-media files.

SUMMARY OF THE INVENTION

In accord with the present invention, a method is defined for hierarchically organizing files of a selected type that are stored in a storage accessed by a computing device, to enable a user to efficiently access desired files from among the files of the selected type in the storage. The method includes the step of scanning the storage with the computing device to identify any content folders in which files of the selected type are included. (Note that throughout this disclosure and in the claims that follow, the term "folder" and its plural form are used, and these terms are intended to be entirely synonymous with the terms "directory" and its plural form, respectively.) A collection hierarchy is then created based upon the content folders that were thus identified. Each content folder is represented as a collection in the collection hierarchy, and each collection in the collection hierarchy is associated with a folder path that indicates where the collection is located in the storage. Selected empty folders (i.e., folders that do not include any files of the selected type) are also included in the collection hierarchy as necessary to enable the path to each collection to be clearly delineated. These empty folders are selected by applying a "sibling rule" and delineate branches in the collection hierarchy that distinguish between the different folder paths associated with the collections. Finally, files of the selected type that are included in each collection are imported into the collection hierarchy.

The sibling rule provides for selecting an empty folder for inclusion in the collection hierarchy if and only if the empty folder has any subfolder that is a content folder, and has a sibling folder that is either a content folder or has any subfolder that is a content folder.

The step of scanning preferably includes the step of omitting one or more predefined types of folders included in the storage while scanning. These predefined types of folders include at least one of a temporary folder in which substantially all of the files included therein are only temporarily stored, an application program folder in which application program files are stored, a filtered folder to which filters are applied in determining the files included therein, a folder that is designated as hidden, and a folder that is a subfolder under a non-current-user profile.

The method further includes the step of automatically importing a new collection into the collection hierarchy. The new collection corresponds to a new content folder that was created since the storage was previously scanned, in response to a user accessing the collection hierarchy. Preferably, the step of automatically importing is implemented when a user selects a collection in the collection hierarchy for browsing.

In addition, a user is preferably enabled to selectively determine whether to automatically detect and import into the collection hierarchy at least one of any new content folder that includes any files of the selected type by providing a new collection corresponding to the new content folder, and any new file of the selected type. In a preferred form of the invention, only new content folders that are no more than a predefined level below an existing content folder are imported into the collection hierarchy, if the user has selectively determined that any new content folder is to be automatically detected and included in the collection hierarchy.

An important aspect of the method is that metadata are automatically associated with each file in the collection hierarchy. The metadata preferably comprise keywords derived from the folder path associated with each file in the collection hierarchy. A user is enabled to search for desired files of the selected type that may be included in the collection hierarchy by searching the metadata for one or more keywords. Furthermore, any changes in the folder path at which a folder included within the collection hierarchy is stored in the storage are preferably automatically detected. Then, the metadata associated with each file of the specific type stored within the folder thus detected are automatically determined as a function of the changes in the folder path.

A further aspect of the present invention is directed to a machine-readable memory medium having machine instructions that are executable by a computing device to carry out a plurality of functions generally consistent with the steps of the method described above.

Yet another aspect of the present invention is directed to a system for hierarchically organizing files of a selected type that are stored in a storage accessed by a computing device, to enable a user to efficiently locate desired files from among the files of the selected type in the storage. The system includes a computing device having logical processing capabilities, a storage coupled to the computing device that provides non-volatile storage of files and data, and a memory that is coupled to the computing device in which machine instructions are stored. When these machine instructions are executed by the computing device, they cause functions to be implemented that are also generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
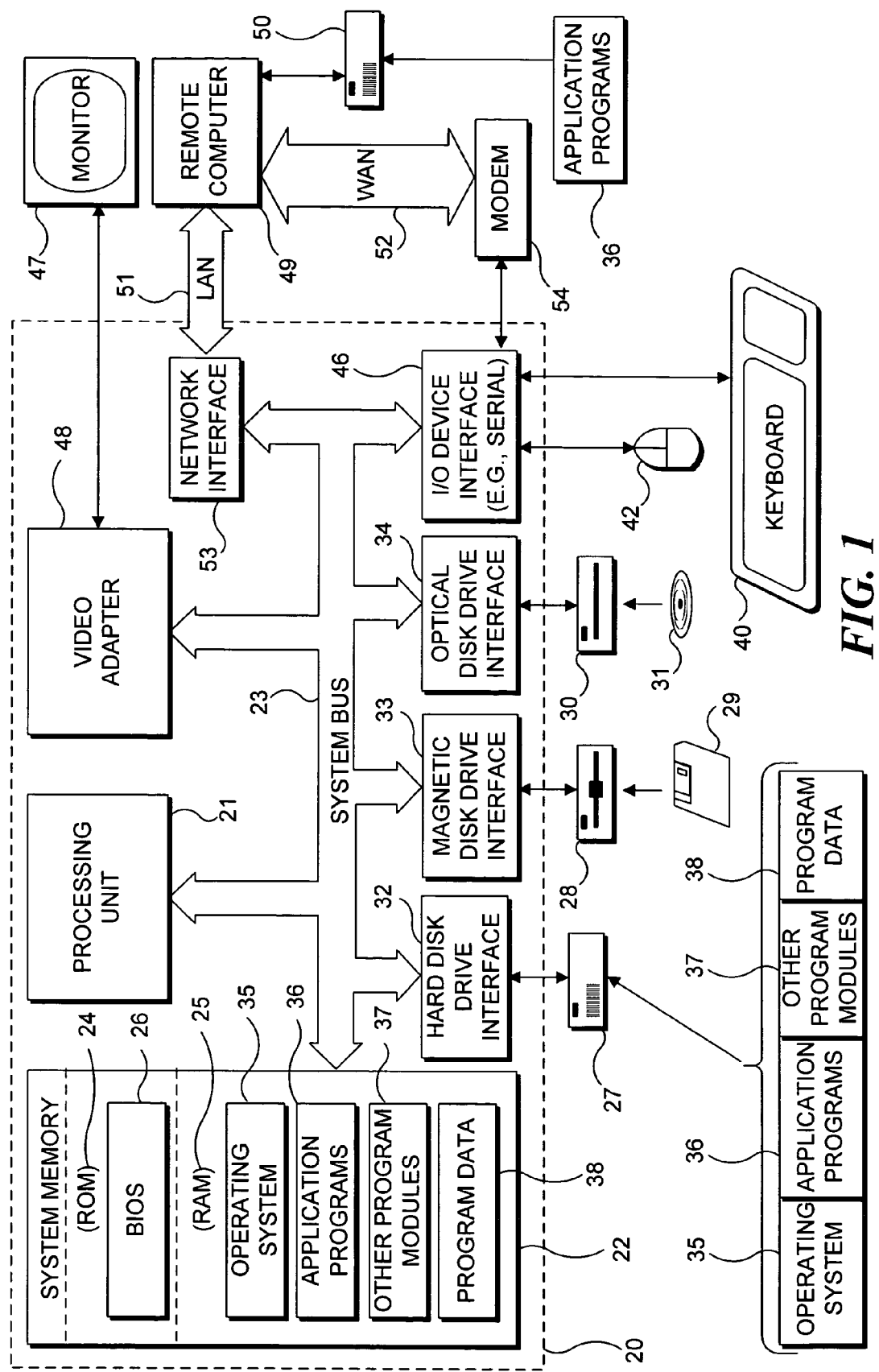
FIG. 1 is a schematic block diagram of an exemplary personal computer system suitable for implementing the present invention.

FIG. 1 and the following discussion are intended to provide a brief, general description of a suitable host computing device with which the present invention may be used. Although not required, the present invention will typically be used with a host computing device that executes computer instructions, such as program modules. These computer instructions are executed by a processor in the host computing device, which may be part of a larger computing network.

Generally, program modules implemented on the host computing device (some of which will be used in connection with the present invention) include routines, programs, objects, components, data structures, etc. that perform particular tasks or implement particular abstract data types. Moreover, those skilled in the art will appreciate that this invention may be practiced with other types of host computing devices, including hand-held devices, pocket personal computing devices, programmable consumer electronic devices, multiprocessor systems, network personal computers (PCs), laptop computers, minicomputers, mainframe computers, and the like. The invention may also be practiced with computing devices in distributed computing environments that include remote processing devices linked through a communications network. In a distributed computing environment, program modules may be located in both local and remote memory storage devices.

With reference to FIG. 1, an exemplary computing system for use in implementing the present invention includes a general purpose computing device in the form of a conventional PC 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within PC 20, such as during start up, is stored in ROM 24. PC 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules and other data for PC 20. Although the exemplary environment described herein employs a hard disk, removable magnetic disk 29, and removable optical disk 31, it will be appreciated by those skilled in the art that other types of computer-readable media, which can store data that is accessible by a computer, such as magnetic cassettes, flash memory cards, digital video disks, Bernoulli cartridges, RAMs, ROMs, and the like, may also be used in the exemplary operating environment. A number of program modules may be stored on the hard disk, magnetic disk 29, optical disk 31, ROM 24, or RAM 25, including an operating system 35, one or more application programs 36, other program modules 37, and program data 38.

A user may enter commands and information into PC 20 through input devices such as a keyboard 40, and through a separate pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface correspondingly used for a serial port, a parallel port, a game port, an infrared port, a radio frequency port, and/or a universal serial bus (USB) port (not separately shown).

A monitor 47 or other type of display device is also connected to system bus 23 via an appropriate interface, such as a video adapter 48, and is usable to display Web pages and/or other information. In addition to the monitor, PCs are often coupled to other peripheral output devices (not shown), such as speakers (through a sound card or other audio interface—not shown) and printers.

PC 20 may operate in a networked environment using logical connections to one or more remote computers, such as a remote computer 49. Remote computer 49 may be another PC, a server (which is typically configured much like PC 20), a router, a network PC, a peer device, a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is connected to system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Current Preferred Application of Invention

It should be noted that the present invention is not specifically limited to organizing and indexing media files, since the same technique can readily be applied to almost any type of file. However, in an initial application, the present invention will be applied to organizing media files, since as noted above in the Background of the Invention, the problems associated with manually managing and organizing media files become increasingly more burdensome as the number of media files stored in different folders on a user's hard drive or other storage continues to grow. Since it will be used for organizing media clips, an initial embodiment of the present invention is thus referred to as a "Clip Organizer."

The present invention addresses problems associated with manually indexing files comprising personal content of a user on a hard disk or other storage by automatically locating the personal content and importing it into a user's personal media database so that the personal content can readily be displayed in a collection hierarchy. As the present invention imports the content into database created by the Clip Organizer, it simultaneously indexes the contents by adding keywords or metadata based upon contextual information that enables a user to find the personal content at a later time using a keyword search. The task of importing hundreds or thousands of clips located in possibly hundreds of folders that may be distributed throughout one or more hard drives and applying useful keywords to them can take many painstaking hours of manual effort. In contrast, the present invention accomplishes this task automatically in a time ranging from within a few seconds to a few minutes, depending upon the volume of personal content in the user's storage. This task is carried out without requiring any mandatory user interaction to facilitate the process. In addition, once the present invention has run to completion, it establishes rules that automatically facilitate importing new media into the collection hierarchy as the new media are added to the user's hard drive(s), even if initially added to the storage without using the present invention and its automated organizing capabilities. Generally, the present invention makes the manual importing and manual indexing of a hard drive user content obsolete, if it is employed at its maximum effectiveness.

Logical Steps Implemented to Scan Hard Drive

Figure 2:
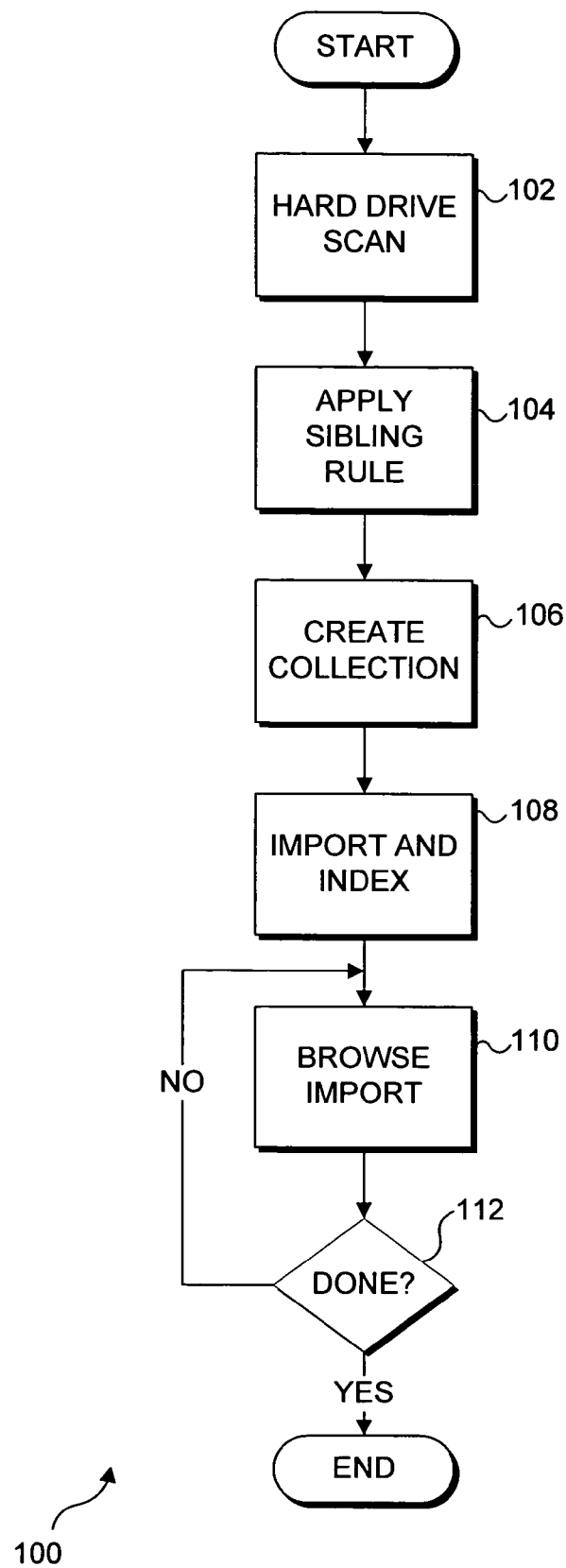
FIG. 2 is a flow chart generally illustrating the logical steps for implementing the present invention.

FIG. 2 illustrates a flow chart 100 that indicates the logical steps generally implemented in the present invention to automatically organize and manage media clips. Media clips will typically include digital photos, audio files, video files, and clip art generated or collected by a user in a storage such as a hard drive. As shown in flow chart 100, the process for organizing media clips with the Clip Organizer begins in a step 102, with a scan of the user's hard drive. (It should be noted that although the singular form "hard drive" is used throughout the following discussion, it is recognized that users of the present invention may have one or more hard drives and/or a user's hard drive(s) may be divided into multiple volumes. Accordingly, it is intended that unless otherwise evident from the context, the term "hard drive" refer generally to any type of storage on which user media files or other user content files are stored and also encompass the plural form "hard drives.")

Figure 3:
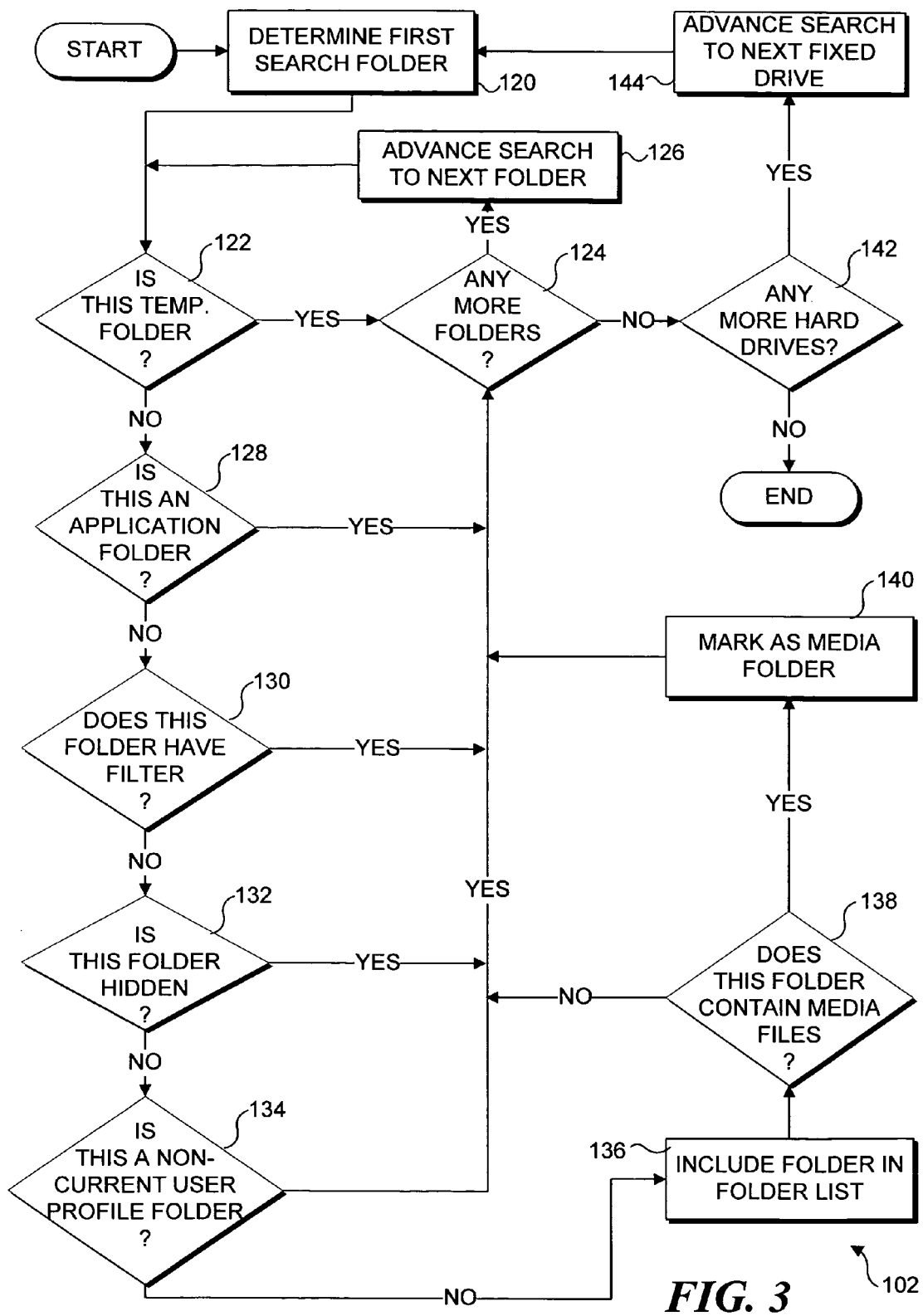
FIG. 3 is a flow chart showing details for carrying out a storage scan to identify folders that should be included a list of folders that will be processed to produce a collection hierarchy.

Details of the steps involved in scanning a user's hard drive are shown in FIG. 3. A key aspect of the hard drive scan is the intelligence applied in identifying folders that contain supported media file types and more importantly, in determining that certain predefined types of folders should not be searched for media files. The scanning component of the Clip Organizer program begins in a block 120 in which the program determines a first search folder on the storage currently being scanned, typically starting with the first folder at the root level of the hard drive being scanned. A decision block 122 determines if the folder being searched is a temporary folder. The purpose of this determination is to avoid scanning temporary folders since temporary media files that are frequently stored in a temporary folder will likely be deleted at some point without user permission. Temporary folders include those identified by the name "TEMP," and those that the WINDOWS™ operating system identifies as temporary folders, which have special significance in the WINDOWS™ operating system for storing temporary files. Other types of temporary folders include those designated by the operating system for Internet cache storage. Since a folder identified as a temporary folder is likely to include only temporary media files that will not be retained, such folders are preferably avoided when scanning the hard drive for user content. A negative response leads to a decision block 128, while an affirmative response to decision block 122 leads to a decision block 124, which determines if there are any further folders to be searched. If so, the logic continues with a block 126, which advances to the next folder on the hard drive. Otherwise, the logic proceeds to a decision block 142, which is discussed below. From block 126, the logic loops back through decision block 122.

Assuming that the current folder is not a temporary folder, the logic proceeds from decision block 122 to decision block 128, which determines if the current folder is an application folder. If so, the logic again loops back through decision block 124, since application folders are omitted from the scan to identify media content. The reason for this omission is that if the scan imported every media file from subfolders under the "Program Files" folder, it would likely import media files provided by third parties as part of application programs. By default, application folders for application programs that are installed on a PC are frequently created under the Program Files root folder. Any third party providing such an application program would likely prefer that the present invention not include such media files that are part of that third party's program and are not part of a user content collection. Accordingly, the hard drive scan avoids the entire Program Files folder subtree, as well as the "System" and "System 32" folder subtrees of the WINDOWS™ operating system, which are also likely to contain third party media files. It is certainly possible for third party applications to be installed in a folder subtree other than under these three predefined folders. In fact, a user can manually override the default rules regarding predefined folders that should be omitted from the scan and customize settings of the present invention so that the "Program Files" folders or other folders omitted by default from the scan are instead included in the hard disk scan. However, the present invention at least attempts to minimize the chance of including media files that are not part of the user's content, although it may not entirely eliminate this risk. Clearly, the goal is to import only content, which is of primary interest to the users, which is their own media files, rather than the media files associated with application programs or other media files that are inappropriate.

If the current folder being scanned is not an application program folder, the logic proceeds to a decision block 130, which determines if the current folder includes a filter. Folders of this type are capable of showing a user only certain files included therein. One common folder that includes a filter is the "Recycle Bin" folder, which typically contains a hidden file called "desktop.ini" that contains a class identification (CLSID) profile string for a computer object model (COM) object. If the "desktop.ini" file is found in a folder and it contains a CLSID or CLSID2 profile string, the disk scan component of the present invention avoids that folder and all of its subfolders, if any.

If the folder has a filter,. the logic loops back to decision block 124, but otherwise proceeds to a decision block 132, which determines if the current folder being scanned is hidden. If so, logic loops back to decision block 124 to avoid scanning a folder that a user or administrator has designated as hidden, since such folders are very unlikely to include media clips produced by the user that should be a part of the collection of user content. Otherwise, the logic proceeds to a decision block 134. In this decision block, the logic determines if the current folder is a profile folder for other than the current user, and if so, again loops back to decision block 124. The basis for this determination is that on a multi-user system, it is likely that different users will have personal media located in or under their own profile folders. Accordingly, it would be a breach of privacy for the present invention to scan any folders in a profile that does not belong to the user who is currently logged on to the computer. The scanning component of the Clip Organizer therefore avoids scanning any profile folder that does not belong to the current user or any subfolders of profile folders for a different user than the current user. The only exception to this rule is that the scan will search the "All Users" profile folder and subfolders thereof, since this profile folder is not considered private and is available to all users of the computer. If the response to this determination is negative, a block 136 provides for including the current folder in a folder list or folders that may include media that should be part of the collection of user content being developed.

Next, the current folder is evaluated in a decision block 138 to determine if the folder contains media files of the user. If not, the logic proceeds back to decision block 124 to select another folder for scanning. However, if the folder does contain media files, the logic proceeds to a block 140 in which the current folder is marked as a media-containing folder.

Once all of the folders have been evaluated in the scan of the hard drive, decision block 124 transfers the logic to a decision block 142, which determines if there are any more hard drives to search. If not, the scanning component logic of the Clip Organizer software terminates. However, if the response to decision block 142 is affirmative, a block 144 provides for advancing the search to the next fixed hard drive or volume of the storage. The logic then repeats the scanning steps discussed above, starting with block 120.

Sibling Rule

Referring back to FIG. 2, following the scan of all of the hard drives on which the user's media might be located, a block 104 applies a sibling rule as a basis for determining which folders without user content should be included in a collection hierarchy to insure that the hierarchy remains understandable in regard to locating collections but is relatively "flat." The sibling rule is a key to striking the correct balance between producing a derived collection hierarchy that is as flat as possible, while insuring that the hierarchy makes sense to a user. Specifically, instead of including only folders with media as part of the collection, the sibling rule provides a basis for creating a collection having folders that do not include user media files. Such "empty" folders are included if and only if they meet certain criteria. Details of the logical steps implemented in applying the sibling rule are illustrated in FIG. 4.

Figure 4:
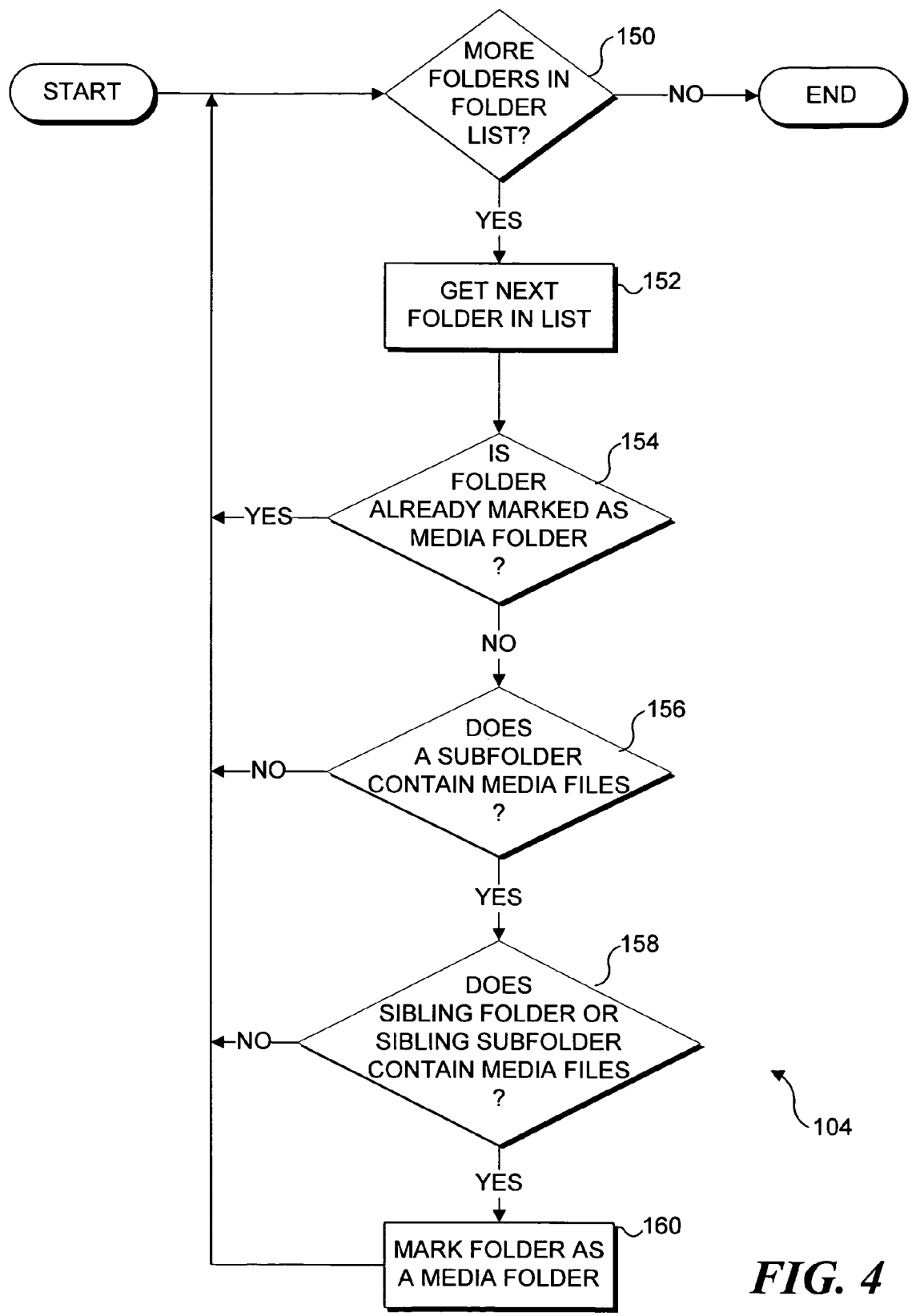
FIG. 4 is a flow chart illustrating details of a sibling rule test that is implemented when creating the collection hierarchy.

FIG. 4 begins with a decision block 150 that determines if there are any more folders in the folder list to be evaluated in accord with the sibling rule. If so, a block 152 obtains the next folder in the list that was created during the scan of folders on the user's hard drive. A decision block 154 then determines if the current folder thus obtained has already been marked as a media folder (i.e., a folder that includes one or more user media files). If so, the logic loops back to decision block 150. Otherwise, the logic proceeds to a decision block 156. In this decision block, a determination is made as to whether the current folder has a subfolder that contains media files. If not, the logic loops back to decision block 150, but otherwise proceeds to a decision block 158. In decision block 158, the logic determines if a sibling folder of the current folder or a subfolder of a sibling folder contains one or more user media files. (A sibling folder is one that is at the same subfolder level below a parent folder as the present folder.) If not, the logic again loops back to decision block 150, but otherwise proceeds to a block 160, in which the current folder is marked as a media folder, i.e., as a folder that will be included in the collection hierarchy. Thereafter, the logic also loops back to decision block 150.

From the preceding explanation, it will be apparent that any folder that does not include media will only be included in the collection hierarchy if and only if any user media files are included in at least one subfolder of that folder and a sibling folder includes any user media files or has subfolders with user media files. The sibling rule provides sufficient empty folders in the collection hierarchy to enable a user to determine the path to media-containing folders and to differentiate between different path branches in the collection hierarchy. By minimizing the number of "empty" folders that must be included to provide complete path information for folders that contain media files of interest, unnecessary clutter is avoided in the collection hierarchy. However, a user can still determine where to find media in folders, since the included empty folders provide a logical hierarchy in which the path and branching between media folders is clearly delineated. In general, root folders, and therefore root collections derived from those root folders, are more recognizable by users than leaf folders. The sibling rule takes this principle into consideration and puts it to good use. If the sibling rule were not applied, and the collection hierarchy only included folders with media, the hierarchy would become so flat as to cause confusion, and users would in some instances be unable to determine where their media files are located within the hierarchy. The sibling rule restores a balance of efficiency based on "flatness," and maintains sufficient hierarchy differentiation to enable a user to understand where media files are located.

Creating the Collection

Again referring back to FIG. 2, the next step in the process implemented by the present invention is to create a collection, as noted in a block 106. This step simply involves the process of creating "folder-like" constructs with the Clip Organizer software application comprising the present invention, to provide a hierarchical relationship between the media collections. The folder-like constructs that are thus created contain only user media (i.e., do not include unsupported file types in them), so that the media files can be found by a user. An important aspect of this step is that when collections are created by the present invention, they are created in a user's media database. With each collection in the database is associated a full path that indicates the location on the hard drive of the collection. Provision of this full path is important, because it sets up an import and indexing component and a browse import component of the present invention, as explained below. In addition, each collection receives an "auto-import state" property. The auto-import state property can have one of three different settings that are user selectable, for updating the collection. These settings include a decision by the user to either: (1) add new or changed files and subfolders to the collection; or (2) add new or changed files only to the collection; or (3) don't add either files or folders to the collection.

By default, the present invention sets the first option to "add new or changed files and subfolders to the collection" and therefore does not require user interaction when this property is initially set. However, if the user subsequently chooses, the option can be reset by the user to a different one of the three options. The auto-import option setting is particularly relevant to the browse import component of the present invention, as explained below. Another important aspect of collection creation is that each storage construct in the media management system has properties that help it to automatically import and index the media files that it contains and make it aware of the file system that it represents.

Importing and Indexing Component

Figure 5:
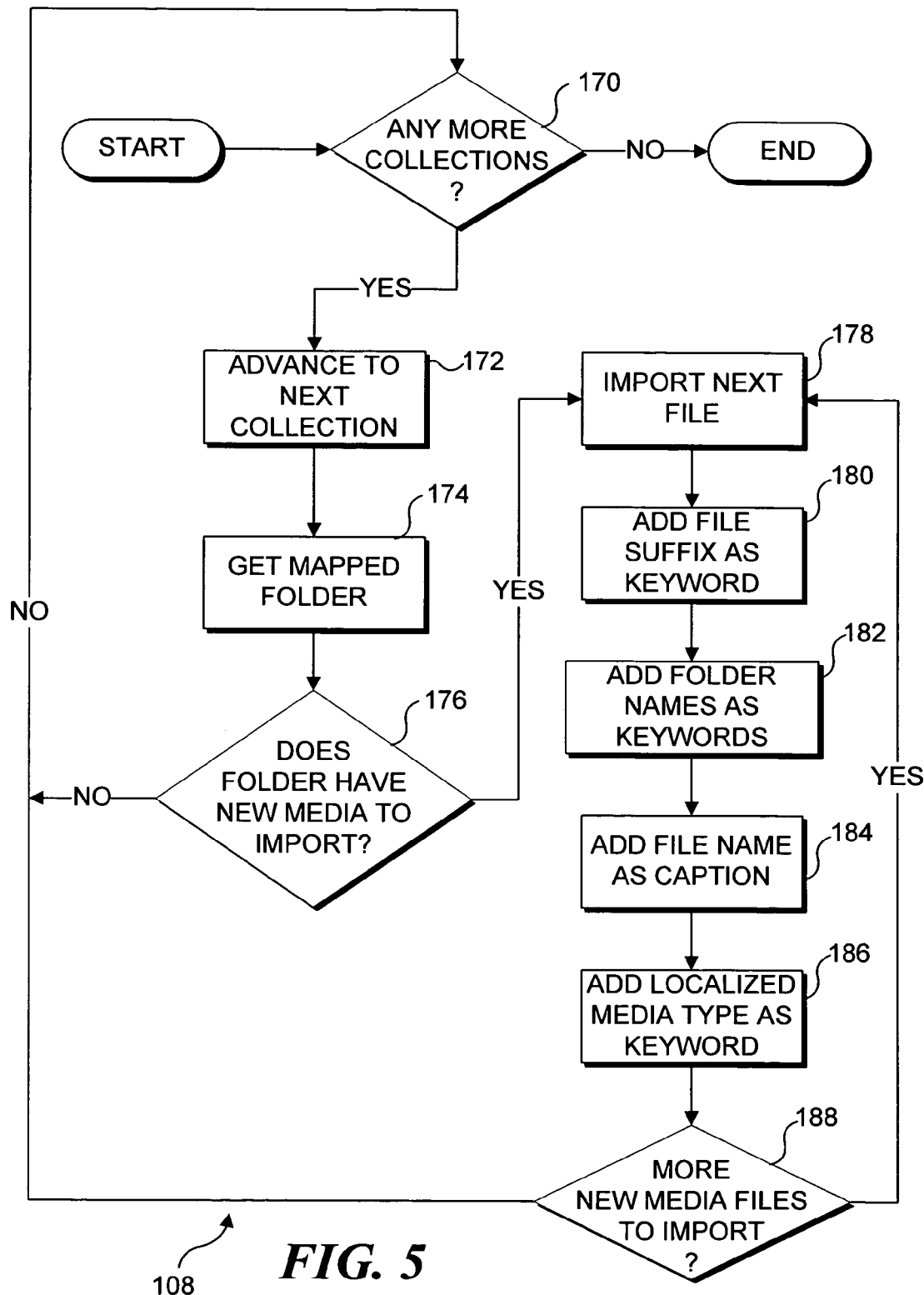
FIG. 5 is a flow chart showing the logical steps carried out for import and indexing of media files.

After creating the collections in block 106, a block 108 provides for carrying out the import and indexing component of the present invention. Details of the steps implemented in importing and indexing are shown in FIG. 5, beginning with a decision block 170. This decision block determines if there are any more collections to be processed. If not, the import and indexing function is completed and this portion of the program terminates. However, if any collection remains to be processed, the logic advances to the first (or next) collection to be processed in a block 172. This step is followed by a block 174 in which the logic obtains a mapped folder, which is a folder associated with the collection currently being processed. A decision block 176 then determines if the folder that was just obtained has any new media to import into the collection. During the initial creation of the collection hierarchy, each folder that includes media files of the user will be treated as if the media is new and must be imported. If not, the logic loops back to decision block 170.

Assuming that the folder being processed indeed includes new media files to import, the logic proceeds to a block 178 and imports the next media file included in the current folder. The file suffix is added as a keyword in the metadata for the file in a block 180. (The suffix is the media file extension, such as "wav" for audio files in the wave format, or "jpg" for digital photographs in the Joint Photographic Experts Group (JPEG) format.) In addition, recalling that each file of a particular media type that is included within a collection will have its full folder path associated with it, a block 182 provides for adding folder names in that path as keywords in the metadata associated with the file.

It is generally assumed that users will typically store media files within a folder structure based upon the content or subject matter of the media files. For example, a user might store a digital photograph file "beach1.jpg" that was taken with an OLYMPUS™ digital camera on the beach during a vacation to Hawaii in 1999 in a folder having a path such as "C:\My Documents\My Photos\Digital Camera\Olympus\Vacations\Hawaii\1999\Beach1.jpg." This path would be parsed by the Clip Organizer software to identify keywords for inclusion in the metadata for the file. These keywords would include: "My Documents," "My Photos," "Digital Camera," "Olympus," "Vacations," "Hawaii," and "1999." For this scheme to operate effectively, users will need to initially store their media files of interest in a folder structure configured so that the path of the media file includes keywords that can be used for locating the media files based on their subject matter, type, topic, and/or other keywords entered by a user in a search dialog that are likely to be part of the metadata associated with the user content in the user collections database.

A block 184 adds additional metadata to the database by including the filename as a caption for the file. In addition, the localized media type, such as "photograph," "clip art," "sound," or "motion" is also included within the metadata for the file stored in the database. A decision block 188 then determines if any further new media files are available to import in the current folder, and if so, the logic returns to block 178 to process the next new media file in the current collection. If not, the logic returns to decision block 170 to determine if any further collections remain to be processed, and if so, processes them in a similar manner. If not, the import and indexing component of the Clip Organizer software is completed and terminates.

It will be evident from the above example in which a path for a particular digital photograph file capturing a beach scene was parsed to determine keywords for inclusion in the metadata for the file, beach1jpg, a user could subsequently locate that file as well as other media files in the database that relate to the vacation in Hawaii by searching the collection hierarchy stored in the collections database, based on the keyword "Hawaii." The user could also specifically identify digital photographs relating to beach scenes by searching for metadata that include the word "beach" within the metadata associated with each of the files included within the collection hierarchy stored in the user's content database.

Clearly, folders and files stored on a hard drive are not static. It is understood that new folders will be created and new content media files will added to the storage without using the present invention. As a result, a different mechanism is provided for including the new content added in this manner so that the new content is incorporated with the user media collections produced by the present invention. Each media collection organized by the present invention has within it a folder path associated with each of its media files. Accordingly, the folder paths for a collection can be automatically examined on the hard drive at the specific locations to determine if a change has been made in the folder path indicating the location where the media files of the collection are stored. Any changes that are detected are used to automatically modify the folder path so that it indicates the new location.

Browse Import Function

When a user browses a collection hierarchy in Clip Organizer, the user may select a collection that is assigned to a specific hard drive location. Accordingly, several events are triggered as a result of the user browsing the collection that depend upon the setting of the auto-import state property selected for that collection. The steps associated with the browsing of a collection are referred to as a browse import function in a block 110 in FIG. 2.

Figure 6:
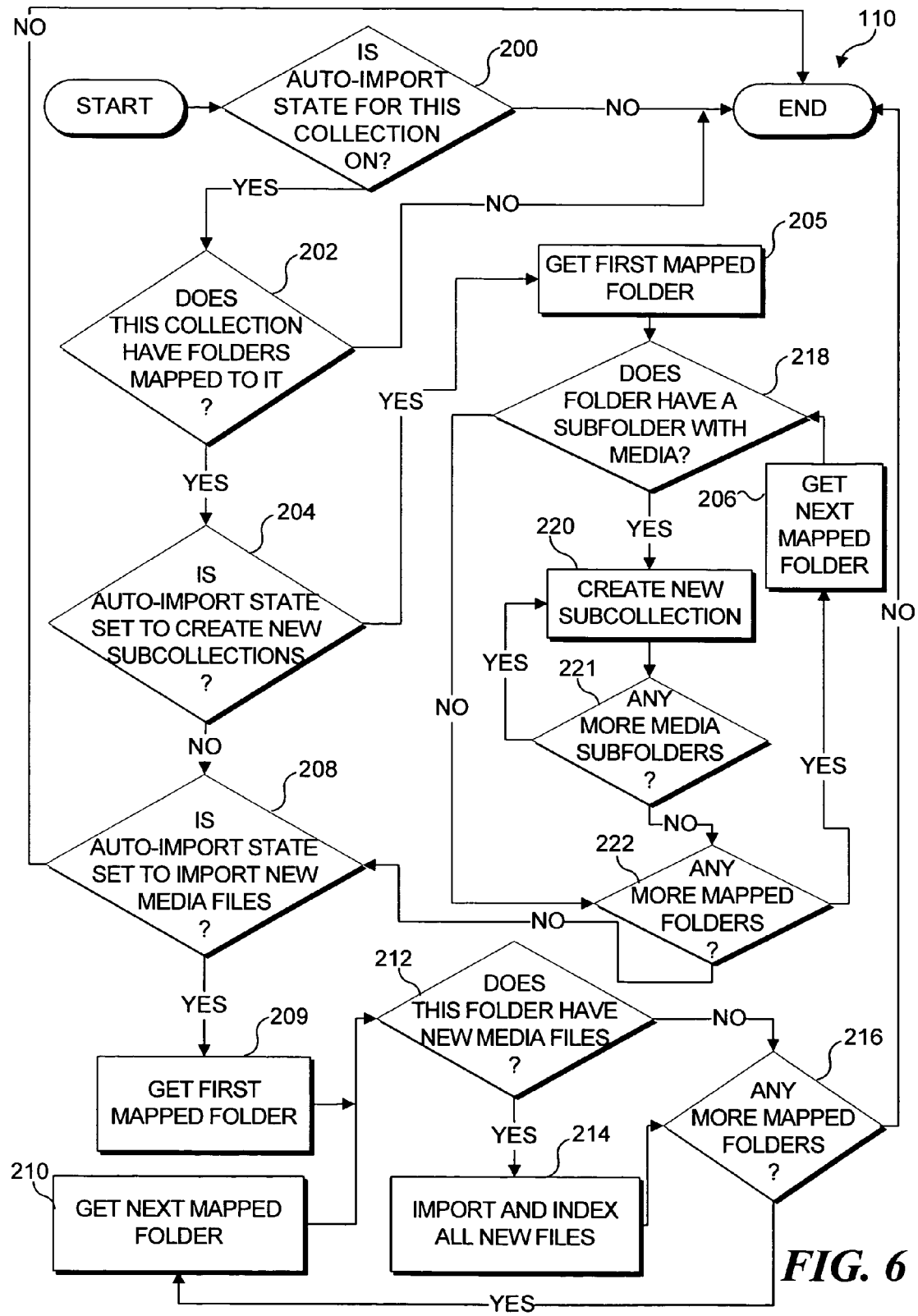
FIG. 6 is a flow chart showing the logical steps implemented in a browse import algorithm used in the present invention.

Details of the logical steps implemented in the browse import function are provided in FIG. 6, beginning with a decision block 200. This decision block determines if the auto-import state for the current collection being browsed has been set ON, which means simply that the collection properties have been set to enable the logic to look for new media files, or new media folders, or both. If not, the user has selectively determined that the program should not look for new files or new folders to be added to the current collection, and the logic terminates for this aspect of the process. As noted above, however, the default setting for the auto-import property is to add new or changed files and subfolders to update a collection. Thus, in most cases, the auto-import state for a collection will be set to the ON condition, leading to a decision block 202. Decision block 202 determines if there are any folders associated with the current collection, and if not, the logic terminates, since there is no requirement for any processing of this collection (i.e., because it does not have any folders to examine for new files or subfolders). Otherwise, the logic proceeds to a decision block 204 to determine if the auto-import state for the current collection being browsed by the user has been set to create new subcollections. Again, the default would be to create new subcollections. Alternatively, a user may have decided to only add new or changed files to the current collection, but not new subcollections. Assuming that the auto-import state provides for creating new subcollections, a block 205 provides for obtaining the first mapped folder for the current collection. A negative response to decision block 204 leads to a decision block 208, which determines if the auto-import state is set to import new media files (i.e., the default condition). If not, the logic terminates. However, if the auto-import setting property indicates that new media files are to be imported into the current collection automatically, the logic proceeds to a block 209 that provides for obtaining the first mapped folder.

A decision block 212 then determines if this folder has new media files associated with it and if not, proceeds to a decision block 216, which determines if there are any more mapped folders (folders associated with the collection). If so, the logic advances to a block 210, in which the next mapped folder is obtained. Thereafter, the logic again returns to decision block 212. Assuming that the current folder has new media files in decision block 212, a block 214 automatically imports and indexes all new files of the media type included within the collections maintained by the present invention. The import and indexing step is carried out in accord with the logic discussed above in connection with FIG. 5. After all new media files associated with the current folder have been imported and indexed, the logic continues with decision block 216. If there are no more mapped folders associated with the present collection in decision block 216, the logic terminates.

Referring again to block 205, after obtaining the mapped folder, the logic proceeds to a block 218 in which a determination is made as to whether the current folder has a subfolder in which media files are included. If so, the next step in a block 220 is to create a new subcollection corresponding to the subfolder and the media files included therein. A negative response to decision block 218 leads to a decision block 222. After block 220, a decision block 221 determines if there are any more subfolders with media files and if so, the logic returns to block 220 to create a new subcollection. A negative response in decision block 221 leads to decision block 222. Decision block 222 determines if there are any more mapped folders and if not, the logic advances to decision block 208. If additional mapped folders exist, the logic proceeds with a block 206 to obtain the next mapped folder in the collection and repeats the steps noted above.

It will be apparent that the auto-importing of files and subcollections in accord with the steps illustrated in FIG. 6 are implemented each time that a user browses a given collection. It should also be noted that the browse initiated auto-import process only applies to subfolders containing new media files found one level down from a currently included mapped folder. Any new media files that reside more than one level down from the existing collection hierarchy folder will not be automatically imported into the collection hierarchy in response to a user browsing. Application of the limitation of one level down subfolder searching is an intended design feature of this preferred embodiment of the present invention. Even though the subfolder search occurs on its own thread, all new entries written to the database for the collection must be written on the primary thread according to this preferred embodiment. It is important that the search be quick and ideally not find too many new collections to create, to avoid having the primary thread slow down to the point at which a user will notice a performance hit in processing speed. By limiting the search to a single subfolder depth, this step can be time efficient so that the user does not notice any significant processing slow down and yet still benefits by having new media folders found and imported into the database as a result of the user simply browsing existing collections. This technique enables users to "instantly" see new collections appear with descriptive names when the steps in block 214 are implemented. When a user selects the newly added collection to investigate, any files found in the hard drive subfolder (one level down) associated with that new collection are also then automatically imported and indexed. Thus, as the user continues to browse to newly added subcollections, additional subfolders are added in accord with the logic discussed above.

It is also important to note that this process has been designed to account for the fact that the folders and media files stored on a hard drive will typically evolve slowly and not radically change in a very short time frame. If users elect to create subfolders on their hard drive and organize files with more granularity, they will typically create subfolders only one level down from existing ones and arrange their files among the new subfolders thus created. Accordingly, the one subfolder down approach discussed above is particularly appropriate. When a user next uses the Clip Organizer to browse a collection associated with an original folder, the new subfolders will be detected and added as a new subcollection of the existing collection. In addition, any files in the subfolders will be imported and indexed automatically for a user. Furthermore, since the newly created collection found by auto-importing folders one level down has a full path associated with it, along with its auto-import state setting that will allow it to find new media subfolders, the user can continually have new subfolders created and new media imported and indexed by repeatedly browsing on each successive newly added collection as it is created. Should a hard drive ever become too radically different for the present invention to adapt to in this manner, the user can always rerun the full scanning algorithm discussed above in connection with FIG. 2 to obtain an updated collection hierarchy that reflects all of the changes made to the storage since the last time the user ran the full scanning algorithm.

As noted above, the user has an option to customize the settings regarding importing of new or changed files and subfolders. Furthermore, these settings can be separately selectively set for each collection and can be optionally set so that the auto-import feature is turned off for both new files and new folders. In this manner, this embodiment of the present invention makes it possible for a user to customize the properties for each collection, if they so choose.

Exemplary User Interface Dialogs

A dialog box 230 included in a preferred embodiment of the present invention enables a user to selectively control adding media files or clips to the collection hierarchy. This dialog box has a title line 232 that reads "Add Clips To Organizer." If the user elects to carry out a default scan of the hard drive, it is only necessary to click on an OK button 236. Also provided is a Cancel button 238. Alternatively, the user can specify the hard disks and/or folders that should be scanned for media clips by selecting an Options control 240 (see FIG. 9, which is described below).

Figure 8:
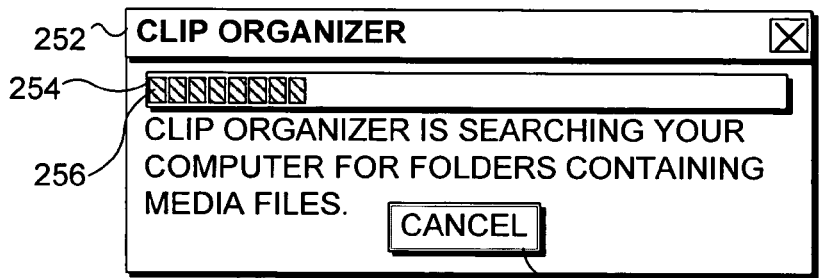
FIG. 8 is an exemplary dialog employed for showing the progress of scanning the user's media storage.

FIG. 8 illustrates a dialog box 250 that is displayed as the user's hard drive or storage is scanned by a preferred embodiment of the present invention. This dialog box includes a title line 252 that reads "Clip Organizer." A progress bar 254 includes a plurality of segments 256 that increase in number to lengthen the progress bar as the scanning of the hard drive and importing of the collections continues. Also provided is a Cancel button 258 that is selectable by a user to interrupt the process.

Figure 7:
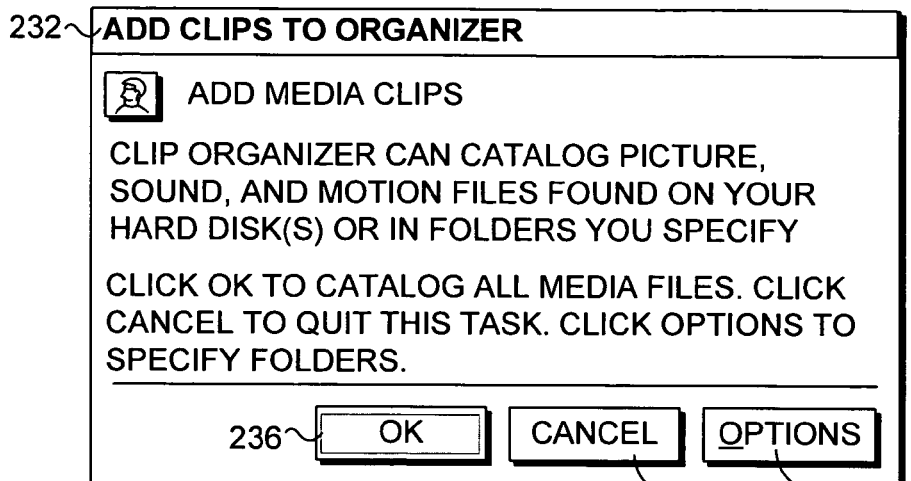
FIG. 7 illustrates an exemplary dialog box for adding clips to the media file organizer.
Figure 9:
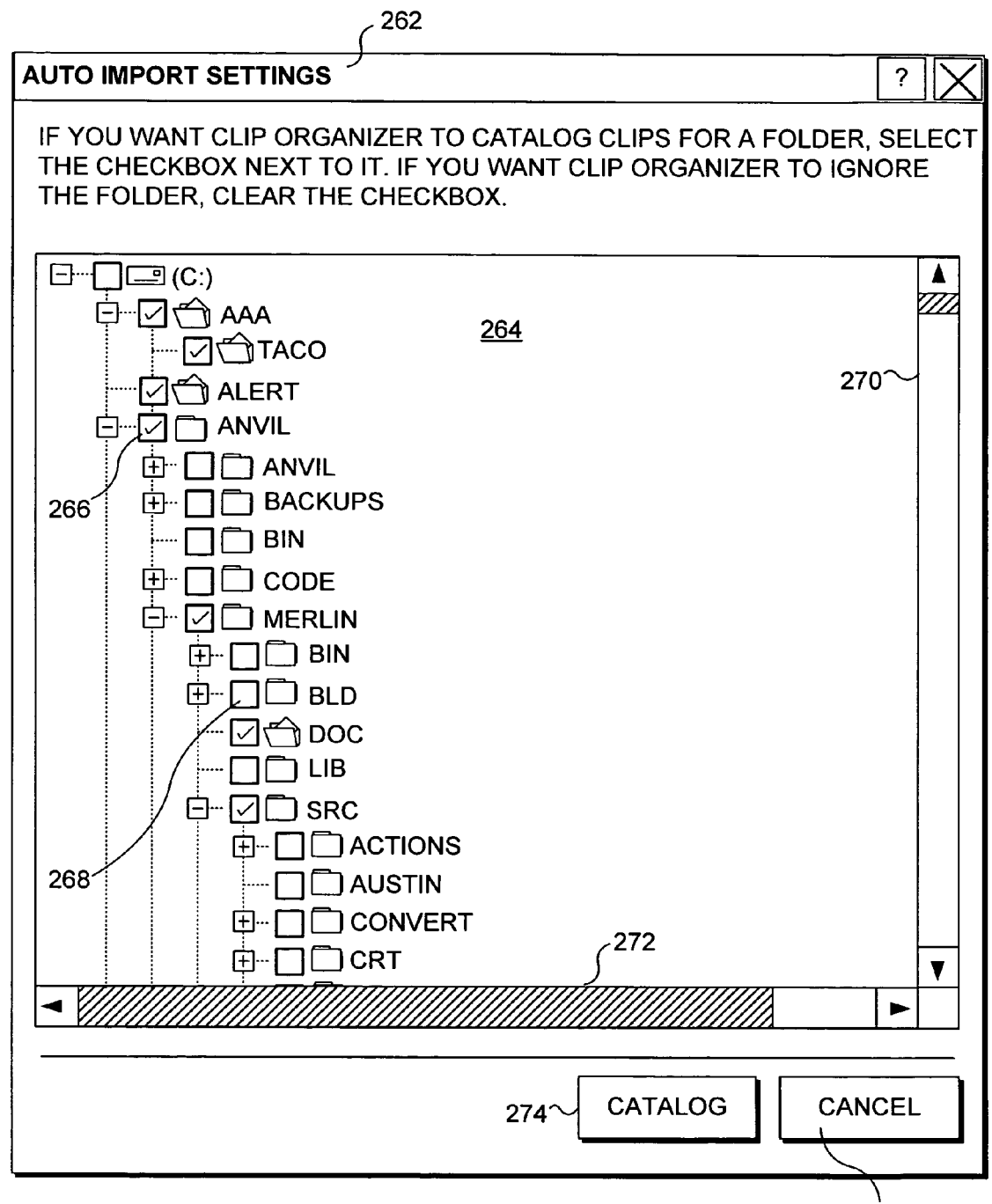
FIG. 9 is an exemplary dialog box enabling a user to select auto-import settings.

FIG. 9 illustrates a dialog 260 presented in response to a user selecting Options control 240 in dialog box 230 (FIG. 7).

Exemplary dialog 260 includes a title line 262 that reads "Auto Import Settings." A folder tree window 264 illustrate the various folders and subfolders on the user's hard drive. Boxes with checks 266 are associated with the folders that were found during the scan to have media files. If a user clears the check mark in a box associated with a specific folder, the present invention will not create a collection for the folder in Clip Organizer, and none of its media files will be imported for the user. A vertical scroll bar and a horizontal scroll bar 272 are included to access folders not currently visible in the dialog folder tree. In addition, a catalog control 274 is selectable by the user to initiate the application of the sibling rule for the folders associated with all remaining checked boxes, creation of collections for those folders, and importation of the media files for the folders. Alternatively, a user can select a Cancel button 276 to close the window.

Figure 10:
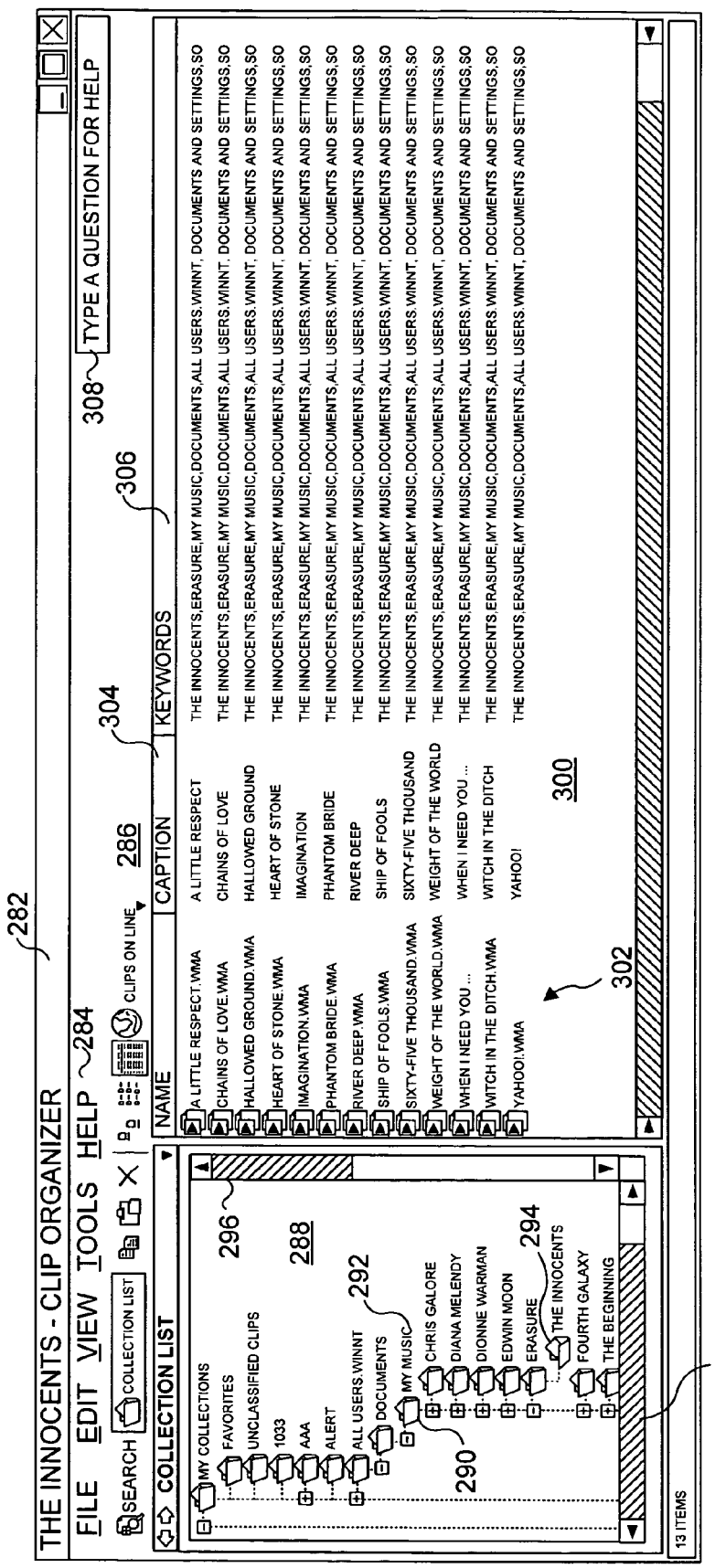
FIG. 10 is an exemplary graphic user interface window for the present invention, showing collections of media files and associated metadata for the media files in a selected collection.

Once a user's hard drive has been scanned and a plurality of collections have been created that include the user's media clips, the user is presented with a collection hierarchy view as shown in exemplary main graphic user interface (GUI) window 280 in FIG. 10. At the top of GUI window 280 are disposed a menu 284 and a toolbar 286. A collections list pane 288 displays a collection hierarchy view. It must be emphasized that the collection hierarchy is generally not identical to the folder tree view (i.e., the WINDOWS™ Explorer view) of the hard drive storage from which the collection hierarchy is derived. The differences between the collection hierarchy view and the folder tree view result because of the flattening of the folder tree that occurs in the collection hierarchy to include only those folders in which media clips are included (and normally excluding the five predefined types of folders that are typically not scanned for media clips), in addition to the empty folders that do not have any media clips, but which are included within the collection hierarchy to differentiate between branches in accord with the sibling rule. Main GUI window 280 includes a title bar 282 that reads "The Innocents—Clip Organizer." The title bar includes the phrase "The Innocents," because a folder 294 with that name has been selected and is open in the collection hierarchy. Media files 302 included within folder 294 are displayed in a file list pane 300 in main GUI window 280. Other folders 290 are included in collections list pane 288, only some of which include media files. Each folder that includes media files corresponds to a different collection. In this particular example, a number of empty folders are included as subfolders under an empty folder 292 entitled "My Music." Vertical and horizontal scroll bars 296 and 298 provide access to additional folders that are not currently visible in collections list pane 288.

In media file list pane 300, the names of each media file in the current selected collection are listed, along with a caption 304 and keywords 306. It should be noted that the keywords are derived from the path of folder 294 and include "The Innocents," "Erasure," "My Music," "Documents," "All Users.Winnt," and "Documents And Settings." The keyword "Sounds" (only partially shown due to space limitations) identifies the type of media clip stored in folder 294, all of which are Windows Media Audio (*.wma) files and thus properly in the category "Sounds." Keywords 306 comprise the metadata that can readily be searched by a user to locate specific media files based upon the content, subject matter, and/or category automatically associated with the files. It should be noted that keywords 306 are not derived from the collection hierarchy, but instead are derived from the full path to folder 294. This point is evident, since the collection hierarchy does not include the folder "Documents and Settings,"

but the full path for the folder does. Optionally, a user can type a question in a text entry box 308 to obtain help on a specific topic.

Figure 11:
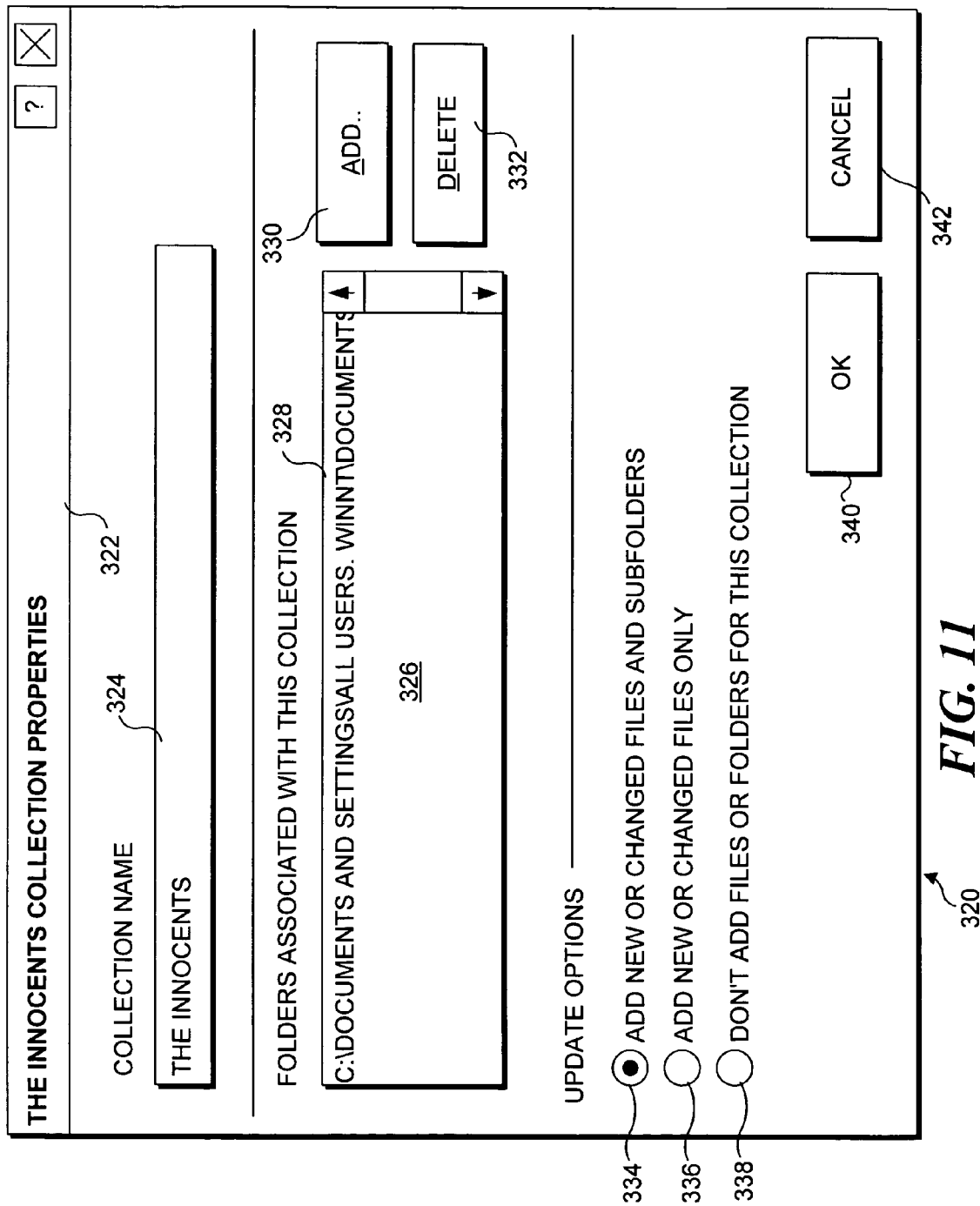
FIG. 11 is an exemplary dialog box showing properties of the selected collection of media files in FIG. 10.

In FIG. 11, an exemplary dialog 320 illustrates properties for The Innocents collection shown in FIG. 10. A title bar 322 reads "The Innocents Collection Properties." A text box 324 includes the name of the collection, "The Innocents," while a path box 326 includes folders associated with the collection by listing a path 328 for it. Optionally, a user can click on an Add button 330 to associate additional folders with the collection, or can select a Delete button 332 to delete folders previously associated with the collection. The lower part of properties box 320 includes the three possible settings for the auto-update option. In this example, the default has been selected as indicated by a radio button 334 that is selected to provide for adding new or changed files and subfolders to the current collection. Alternatively, a user can select radio button 336, which provides for adding new or changed files only, or radio button 338, which provides for not adding files or subfolders to this collection. Once the options have been selected, a user can select an OK button 340, or may select a Cancel button 342 if the user decides not to modify the properties for the collection.

Figure 12:
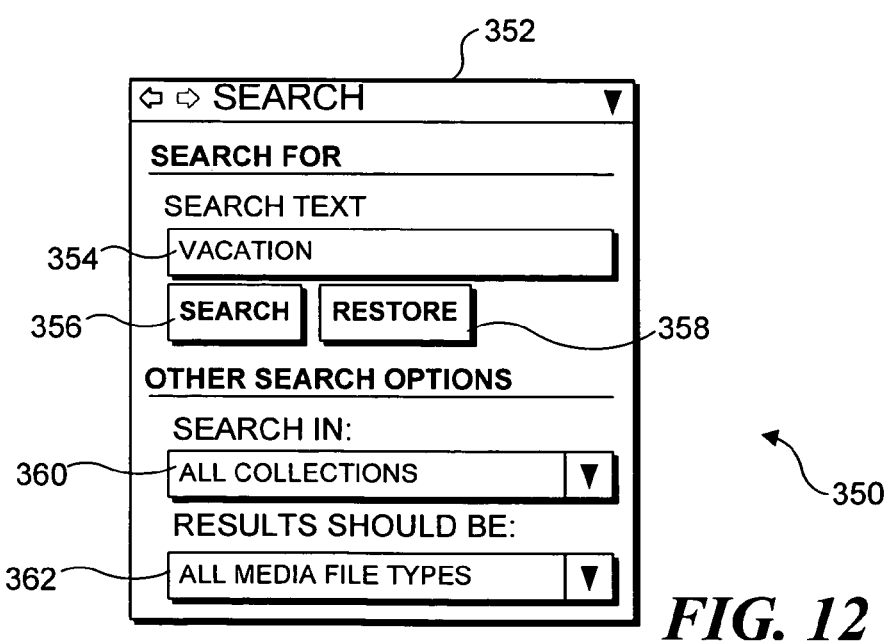
FIG. 12 is an exemplary dialog box used for searching for a specific media file or type of media file among a user's collections of media files based on one or more keywords.

Referring now to FIG. 12, a dialog 350 is opened to enable a user to search and locate a particular user media file or type of media file in the user's collections. Search dialog 350 has a title bar 352 that reads "Search." If the user wants to search for keywords in the metadata associated with the media files, the user will enter the likely keywords in a text block 354. In this example, the user has entered the text "Vacation," indicating that any media file having that text string in its path and thus automatically included in the metadata for the file as a result of the automatic indexing of the media files will be located by the search. A Search control button 356 is selected once the desired keywords have been entered, or the user can restart the text entry process by selecting a Restore control button 358. A drop down list box 360 includes options that enable a user to choose to search all collections, or to pick one or more specific collections to search. Also, a drop down list box 362 is provided that enables a user to search all media files, or limit the search for a specific one or more types of media files. When the Search control is selected, a list of all media files meeting the desired criteria will be displayed to the user.

Although the present invention has been described in connection with the preferred form of practicing it and modifications thereto, those of ordinary skill in the art will understand that many additional modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer-implemented method for automatically indexing a collection of files of a selected type to enable searching for desired files within the collection based upon index data produced by indexing the collection, comprising the steps of:
scanning a storage device to identify content folders to identify the collection of files of a selected type, wherein the identified content folders are a predetermined subset of folders excluding at least temporary folders;
associating a folder path of each file included in the collection with the file;
parsing the folder path of each file to extract metadata of the file, the metadata comprising a plurality of subparts of the folder path and including a folder name as one of the subparts of the folder path, each folder name in the folder path of the file comprising a separate index in the metadata to the file that is independently searchable and maintained in a collection hierarchy separately from a directory structure for files;
associating the metadata that were extracted, with files in the collection, so that for each such file, the metadata extracted by parsing the folder path for the file comprise index data employable to subsequently automatically locate the file by searching for an index included in the metadata for the file;
providing results of searching to a user by using the index included in the metadata for the file; and
automatically detecting and automatically importing new media files, in the folder path where a collection is stored, in response to one of the files in the collection being accessed.

2. The method of claim 1, wherein providing results of searching comprises searching for a desired file of the selected type that is included within the collection, as a function of a searchable index in the metadata for the file.

3. The method of claim 2, further comprising the step of receiving, from a user, index data related to a desired file of the selected type that is included within the collection, in order to search for the desired file among the files in the collection based upon the index data received from the user.

4. The method of claim 1, wherein for each file in the collection, the metadata comprise keywords derived from at least one of:
the folder path associated with the file;
a file extension of the file;
a caption based upon a filename of the file; and
a file type associated with the file.

5. The method of claim 1, further comprising the steps of automatically extracting metadata for each new file of the specific type that is added, by parsing a folder path specifying a location of the new file; and automatically associating the metadata thus extracted with the new file to provide index data to locate the new file.

6. The method of claim 5, further comprising the step providing an interface to a user to selectively determine whether to automatically extract the metadata for each new file added to a collection.

7. The method of claim 1, further comprising the step of automatically creating a plurality of collections by scanning with a computing device to identify content folders that include files of the specific type, each said content folder corresponding to one of the plurality of collections and having a folder path associated with it each collection in the collection hierarchy.

8. The method of claim 7, further comprising the step of organizing the plurality of collections into a collection hierarchy to provide more efficient browsing of the plurality of collections and to locate a desired file of the specific type within the plurality of collections.

9. The method of claim 8, further comprising the step of including empty folders in the collection hierarchy, an empty folder being included whenever the empty folder meets a sibling rule, meeting the sibling rule causing the inclusion of the empty folder, which ensures that a path to a collection is clearly indicated in the collection hierarchy because inclusion of the empty folder in a path distinguishes between different paths to the collection.

10. The method of claim 9, wherein said sibling rule includes selecting an empty folder to include in the collection hierarchy whenever the empty folder:

has any subfolder that is a content folder; and
has a sibling folder that is either:
    a content folder; or
    has any subfolder that is a content folder.

11. The method of claim 1, further comprising the steps of:
automatically detecting changes in the folder path where a collection is stored; and
automatically modifying the metadata associated with each file of the specific type in the collection of the preceding step, based upon the changes in the folder path.

12. The method of claim 1, wherein the files of the specific type are media files.

13. A machine-readable memory medium having machine instructions that are executable by a computing device to carry out a plurality of functions, comprising:
    associating a folder path for each file of a specific type included in a collection of files of the specific type;
    parsing the folder path for each file of the specific type to extract metadata for the file, the metadata comprising a plurality of subparts of the folder path and including a folder name as one of the subparts of the folder path, each folder name in the folder path of the file comprising a separate index in the metadata for the file that is independently searchable and maintained in a collection hierarchy separately from a directory structure for files;
    associating the metadata from the step of parsing with files of the specific type in the collection, so that for each such file, the metadata produced by parsing the folder path for the file is associated with the file and comprise index data usable to automatically locate the file by searching for an index included in the metadata of the file in the index data, so that the file can be displayed or used for other purposes, and
    providing results of searching to a user by using the index included in the metadata of the file,
    wherein the plurality of functions further include
    automatically creating a plurality of collections by scanning with a computing device to identify content folders that include files of the specific type, each said content folder corresponding to one of the plurality of collections and having a folder path associated with each collection in the collection hierarchy,
    organizing the plurality of collections into a collection hierarchy, and
    incorporating empty folders in the collection hierarchy, an empty folder being included whenever the empty folder meets a sibling rule, meeting the sibling rule causing the inclusion of the empty folder, which ensures that a path to a collection is clearly indicated in the collection hierarchy because inclusion of the empty folder in a path differentiates between different paths to the collection, and
    wherein said sibling rule includes selecting an empty folder for inclusion in the collection hierarchy whenever and only whenever the empty folder:
    has any subfolder that is a content folder; and
    has a sibling folder that is either:
        a content folder; or
        has any subfolder that is a content folder.

14. The machine-readable memory medium of claim 13, wherein the plurality of functions further include receiving from a user an input directed to search for a desired file of the selected type that is included within the collection.

15. The machine-readable memory medium of claim 14, wherein the plurality of functions further include receiving user entered index data expected to be associated with the desired file of the selected type that is included within the collection, to search for the desired file among the files in the collection, as a function of a searchable index in the metadata for the file.

16. The machine-readable memory medium of claim 13, wherein parsing is implemented by deriving keywords from the metadata, each keyword being derived from at least one of:
    the folder path associated with the file;
    a file extension of the file;
    a caption based upon a filename of the file; and
    a file type associated with the file.

17. The machine-readable memory medium of claim 13, wherein the plurality of functions further include automatically extracting metadata of each new file of the specific type that is added, by parsing a folder path specifying a location of the new file; and, automatically associating the metadata thus extracted with the new file to provide index data to locate the new file.

18. The machine-readable memory medium of claim 13, wherein the plurality of functions further include:
    automatically detecting changes in the folder path where a collection is stored; and
    automatically modifying the metadata associated with each file of the specific type in the collection of the preceding step, based upon the changes in the folder path.

19. A system for hierarchically organizing files of a selected type that are stored in a storage accessed by a computing device, to enable a user to access desired files from among the files of the selected type in the storage, comprising:
    a computing device having logical processing capabilities;
    a storage coupled to the computing device, said storage providing non-volatile
    storage of files and data; and
    a memory that is coupled to the computing device, said memory storing machine instructions, which when executed by the computing device, cause the following functions to be implemented:
    scanning a storage device to identify content folders to identify the collection of files of a selected type, wherein the identified content folders are a predetermined subset of folders excluding at least hidden folder;
    associate a folder path for each file included in the collection;
    parse the folder path for each file to extract metadata for the file, the metadata comprising a plurality of subparts of the folder path and including a folder name as one of the subparts of the folder path, each folder name in the folder path of the file comprising a separate index in the metadata for the file that is independently searchable and maintained in a collection hierarchy separately from a directory structure for files;
    associate the metadata that were extracted, with files in the collection, so that for each such file, the metadata extracted by parsing the folder path for the file are usable to provide index data employed to subsequently automatically locate the file by searching for an index included in the metadata of the file,
    provide results of searching to a user by using the index included in the metadata of the file; and
    detect and import new media files, in a subfolder at least one level down from a currently mapped folder of a collection, in response to a file in the collection being accessed.

20. The system of claim 19, wherein the machine instructions further cause the computing device to receive user input to search for a desired file of the selected type that is included within the collection, as a function of a searchable index in the metadata for the file.

21. The system of claim 20, wherein the machine instructions further cause the computing device to receive input from the user who searches for the desired file of the selected type to specify index data related to the desired file of the selected type that is included within the collection, to search for the desired file among the files in the collection based upon the index data specified by the user.

22. The system of claim 19, wherein when parsing, the computing device derives keywords from the metadata, each keyword being derived from at least one of:
 the folder path associated with the file;
 a file extension of the file;
 a caption based upon a filename of the file; and
 a file type associated with the file.

23. The system of claim 19, wherein the machine instructions further cause the computing device to automatically extract metadata for each new file of the specific type that is added, by parsing a folder path specifying a location of the new file; and automatically associate the metadata thus extracted with the new file to provide index data for locating the new file.

24. The system of claim 19, wherein the machine instructions further cause the computing device to automatically create a plurality of collections by scanning a storage with a computing device that is coupled with the storage, to identify content folders in the storage that include files of the specific type, each said content folder corresponding to one of the plurality of collections and having a folder path associated with each collection in the collection hierarchy.

25. The system of claim 24, wherein the machine instructions further cause the computing device to organize the plurality of collections into a collection hierarchy to enable more efficient browsing of the plurality of collections and to locate a desired file of the specific type.

26. The system of claim 25, wherein the machine instructions further cause the computing device to include empty folders in the collection hierarchy, an empty folder being included whenever the empty folder meets a sibling rule, meeting the sibling rule causing the inclusion of the empty folder, which ensures that a path to a collection is clearly indicated in the collection hierarchy because inclusion of the empty folder in a path differentiates between different paths to the collection.

27. The system of claim 26, wherein said sibling rule includes selecting an empty folder to include in the collection hierarchy whenever the empty folder:
 has any subfolder that is a content folder; and
 has a sibling folder that is either:
 a content folder; or
 has any subfolder that is a content folder.

28. The system of claim 25, wherein the machine instructions further cause the computing device to:
 automatically detect changes in the folder path where a collection is stored; and automatically modify the metadata associated with each file of the specific type in the collection of the preceding step, based upon the changes in the folder path.

* * * * *